United States Patent
Ito et al.

(10) Patent No.: US 8,136,174 B2
(45) Date of Patent: Mar. 20, 2012

(54) URINAL

(75) Inventors: Tairo Ito, Machida (JP); Masayuki Kuzumaki, Yamanashi (JP); Masakazu Takahashi, Tokyo (JP); Takashi Tenma, Tokyo (JP)

(73) Assignee: ECO DEVELOPMENT Co., Ltd., Tokyo (JP)

( * ) Notice: Subject to any disclaimer, the term of this patent is extended or adjusted under 35 U.S.C. 154(b) by 441 days.

(21) Appl. No.: 12/521,281

(22) PCT Filed: Dec. 14, 2007

(86) PCT No.: PCT/JP2007/074089
§ 371 (c)(1),
(2), (4) Date: Jun. 25, 2009

(87) PCT Pub. No.: WO2008/078574
PCT Pub. Date: Jul. 3, 2008

(65) Prior Publication Data
US 2010/0064425 A1   Mar. 18, 2010

(30) Foreign Application Priority Data
Dec. 25, 2006  (JP) ................. 2006-347634

(51) Int. Cl.
*E03D 13/00*   (2006.01)
(52) U.S. Cl. .............................. 4/309; 4/302
(58) Field of Classification Search .......... 4/302, 304, 4/305, 309
See application file for complete search history.

(56) References Cited

U.S. PATENT DOCUMENTS

| | | | | |
|---|---|---|---|---|
| 5,251,872 A | * | 10/1993 | Kodaira | 4/304 |
| 5,680,658 A | * | 10/1997 | Ho | 4/309 |
| 6,581,215 B1 | * | 6/2003 | Tai | 4/309 |

FOREIGN PATENT DOCUMENTS

| | | |
|---|---|---|
| CN | 2281373 Y | 5/1998 |
| JP | 3063720 U | 3/1991 |
| JP | 9-158299 A | 6/1997 |
| JP | 2001-227043 A | 8/2001 |
| JP | 2001-241086 A | 9/2001 |
| JP | 2002-253646 A | 9/2002 |

OTHER PUBLICATIONS

Chinese Office Action issued Jun. 18, 2010, for Chinese Patent Application No. 200780029772.

* cited by examiner

*Primary Examiner* — Tuan Nguyen
(74) *Attorney, Agent, or Firm* — Smith Patent Office

(57) ABSTRACT

An object is to provide a urinal which prevents offensive odors, reduces the consumption of urinal cleaning water and prevents clogging of the urinal drain pipe line. The urinal of the present invention includes a human body sensor (7), a control unit (11), a mechanism to generate a gas with high detergency (14), a gas flow line (La) in which generated gas with high detergency flows, and a cleaning water supply line (Lw) in which cleaning water flows, and the gas flow line (La) and the cleaning water supply line (Lw) converge to mix the gas with high detergency with the cleaning water, and a cleaning fluid line (Lc) formed by confluence of the gas flow line (La) and the cleaning water supply line (Lc) is communicated with a cleaning fluid ejection hole (5) on a urinal upper edge (1a).

2 Claims, 14 Drawing Sheets

URINAL

TECHNICAL FIELD

The present invention relates to men's toilet bowls or urinals.

BACKGROUND ART

In recent years, there has been a tendency that ordinary houses have no toilet for men or urinal because the toilet is presumed to be shared by men and women.

On the other hand, office buildings and other commercial facilities have toilets for men and those for women separately. Therefore, commercial facilities still have demand for urinals.

In connection with the recent growing consciousness of environmental issues, demand for water saving and/or $CO_2$ emission reduction is becoming stronger.

However, if the quantity of cleaning water is reduced for the purpose of water saving, it is difficult to flush away the urine adhering to the urinal. The urine which has not been flushed away might cause a bad smell and smell up the toilet for men.

In other words, urinal cleaning and water saving are contradictory and water saving in urinals has been very difficult.

Besides, it is well known that in the use of a urinal, urine which has collided against the urinal splashes over a wide area as droplets. The urine droplets which have splashed over a wide area are not all flushed away with cleaning water but some remain around the urinal.

Also, since urine is organic, the remaining urine droplets may putrefy and give off a bad smell.

Furthermore, another problem is that if filth exists in the urinal drain (urine drain) pipe line, urine may stay and accumulate around the filth and consequently become a urine stone which may clog the drain pipe line.

For example, another conventional technique is that ozone gas and tap water are supplied to an injector and homogenously mixed and stirred to generate ozone water and the generated ozone water is supplied to the urinal (see Patent Document 1).

However, in such conventional technique, anything about when to supply ozone in urination and how to control ozone supply is not disclosed, making it difficult to do automatic cleaning of the urinal effectively. In addition, the above problem cannot be solved.

Patent Document 1: Japanese Patent Application Laid-Open Publication No. 2001-241086

SUMMARY OF THE INVENTION

Problems to be Solved by the Invention

The present invention has been proposed in view of the above problem of the conventional technique and has an object to provide a urinal which prevents offensive odors, reduces the consumption of urinal cleaning water and prevents clogging of urinal drain pipe line.

Means for Solving the Problems

A urinal (system A) according to the present invention is characterized by including a human body sensor (7), a control unit (11), a mechanism (for example, an ozonizer 14) to generate a gas with high detergency (for example, air mixed with ozone), a gas flow line (La) in which generated gas with high detergency flows, and a cleaning water supply line (Lw) in which cleaning water flows, wherein the gas flow line (La) and the cleaning water supply line (Lw) converge to mix the gas with high detergency with the cleaning water, a cleaning fluid line (Lc) formed by confluence of the gas flow line (La) and the cleaning water supply line (Lw) is communicated with a cleaning fluid ejection hole (5) on a urinal upper edge (1a), and the control unit (11) is configured to perform control operation so that when the human body sensor (7) detects the urinal (1) being in use, gas with high detergency is ejected from the cleaning fluid ejection hole (5) through the gas flow line (La) and the cleaning fluid line (Lc) for a first specified time; and when the human body sensor (7) detects completion of use of the urinal (1), combined and mixed cleaning water and gas with high detergency are passed through the cleaning fluid line (Lc) and ejected from the cleaning fluid ejection hole (5) for a second specified time (Claim 1).

As gas with high detergency, ozone ($O_3$), stabilized chlorine ($Cl_4$), oil essences of various evaporated chemicals, and herb, catechin, flavonoid, parabole and the like in the gaseous phase may be used.

A control method for controlling a urinal according to the present invention in which the urinal (1) includes a human body sensor (7), a control unit (11), a mechanism (for example, an ozonizer 14) to generate a gas with high detergency (for example, air mixed with ozone), a gas flow line (La) in which generated gas with high detergency flows, and a cleaning water supply line (Lw) in which cleaning water flows, wherein the gas flow line (La) and the cleaning water supply line (Lw) converge to mix the gas with high detergency with the cleaning water, a cleaning fluid line (Lc) formed by confluence of the gas flow line (La) and the cleaning water supply line (Lw) is communicated with a cleaning fluid ejection hole (5) on a urinal upper edge (1a), includes the step (S11) of the human body sensor (7) detecting whether or not the urinal (1) is in use, the step (S16) of ejecting gas with high detergency through the cleaning fluid ejection hole (5) for a first specified time upon detecting that the urinal (1) is in use, and the step (S17) of the human body sensor (7) detecting whether or not the use of the urinal (1) has been completed, and the steps (S19, S20) of ejecting combined and mixed cleaning water and gas with high detergency from the cleaning fluid ejection hole (5) for a second specified time.

In the urinal (A) according to the present invention, it is preferable that the control means (11) be configured to perform control operation so that after the combined and mixed cleaning water and gas with high detergency are passed through the cleaning fluid line (Lc) and ejected from the cleaning fluid ejection hole (5) for the second specified time, the gas with high detergency is passed through the gas flow line (La) and the cleaning fluid line (Lc) and ejected through the cleaning fluid ejection hole (5) for a third specified time (Claim 2).

Accordingly, in the control method for controlling the urinal (A) according to the present invention, it is preferable to have a step (S21) in which after the combined and mixed cleaning water and gas with high detergency are ejected from the cleaning fluid ejection hole (5) for the second specified time, gas with high detergency is ejected from the cleaning fluid ejection hole (5) for the third specified time.

In embodying the present invention, it is preferable to use clean water or reused water as cleaning water. It is also preferable that the cleaning water supply line (Lw) be provided with a mechanism (water activator 2) to make cleaning water flowing in the cleaning water supply line (Lw) functional water (structured to functionalize the water). Here, as a mechanism to make cleaning water the functional water (mechanism to functionalize the water), a mechanism which generates a magnetic field to apply a strong magnetic force to the water flowing in the cleaning water supply line (Lw) may be used.

Effect of the Invention

According to the present invention which provides the above configuration, as cleaning water is mixed with a gas (for example, air mixed with ozone), the apparent volume of cleaning water is increased. Therefore, even when consumption of cleaning water is smaller than in conventional urinals, the area wetted with cleaning water in the urinal (1) is the same or more and urine is not left in the urinal (1).

In addition, since cleaning water is mixed with a gas with high detergency (oxidation ability) (for example, ozone or other evaporated chemical), the urine staying in the urinal (1) is oxidized or cleaned and decomposed not to become a source of offensive odor.

This permits reduction in consumption of cleaning water while unfailingly preventing offensive odors in the urinal (1).

Also, according to the urinal in the present invention, since during use (urination), the gas with high detergency (air mixed with ozone or the like) is supplied from the upper part of the urinal (1) in a way to overflow to the area around the urinal (1), even when urine hits the urinal (1) and droplets of urine scatter, the droplets of urine are cleaned (for example, oxidized) as they inevitably contact the gas with high detergency.

In other words, droplets of urine scattered around the urinal (1) are cleansed (for example, when they contact ozone, they are oxidized) and thus clean enough not to cause the organic matter in the urine to putrefy and become a source of offensive odor.

For this reason, it is possible to prevent offensive odors due to droplets of urine scattered around the urinal (1).

In addition, since cleaning water contains a gas with high detergency (oxidation ability) (for example, ozone), when the cleaning water used to clean the urinal (1) flows in the drain pipe line, the gas also flows in the drain pipe line; therefore, urine stones which might accumulate in the drain pipe line can be washed and decomposed. This suppresses accumulation or growth of urine stones in the drain pipe line and thus prevents clogging of the drain pipe line.

When the user discharges a so-called "last droplet" of urine during use (urination), the "last droplet" may splash outside the urinal (1).

However, according to the present invention, when gas with high detergency (air mixed with ozone or the like) is ejected from the upper part (1a) of the urinal after the user leaves the urinal (1) (Claim 2), gas with high detergency like ozone goes down because it is heavier than the air, and overflows from the inside of the urinal (1) and covers the floor area around the urinal (1).

Since the floor area around the urinal (1) is covered by gas with high detergency, even if the "last droplet" of urine splashes outside the urinal (1), it contacts the gas with high detergency covering the floor area around the urinal (1) and is cleaned (for example, oxidized). As a consequence, splashed urine is prevented from putrefying and becoming a source of offensive odor.

In embodying the present invention, the use of reused water as cleaning water prevents inefficient use of water, contributing to water saving.

Moreover, by making the clean water or reused water used as cleaning water functional water, water clusters are made smaller and the cleaning effect is improved.

BEST MODE FOR CARRYING OUT THE INVENTION

Next, embodiments of the present invention will be described referring to the accompanying drawings.

First, a first embodiment will be described referring to FIGS. 1 to 12.

In FIG. 1, a urinal system as wholly designated by symbol A has a urinal body (urinal) 1, a control section 10, a gas flow line La, a cleaning water supply line Lw, and a cleaning fluid line Lc.

The control section 10 is composed of a control unit 11, a blower 12, a high voltage transformer 13 and an ozone generator (ozonizer) 14. The control section 10 is connected with an AC power supply 9 (for example, a commercial power supply).

The control unit 11 controls start and stop of the blower 12 and the revolution speed of the blower motor and also operates the high voltage transformer 13 to control high voltage current supply to the ozonizer 14.

As a high voltage current is supplied to the ozonizer 14, it generates ozone with high detergency. The generated ozone is mixed with air pressure-fed from the blower 12 and flows in the gas flow line La as an ozone-containing air.

In the cleaning water supply line Lw, an electromagnetic valve V1, a flush valve V2, a water activator 2, a check valve V3, and a swirl generator 3 are arranged from upstream (side distant from the urinal 1) in the order of mention.

The water activator 2 is a device which generates a magnetic field in the cleaning water supply line Lw so that a strong magnetic force is applied to cleaning water flowing in the cleaning water supply line Lw.

Though not illustrated in the figure, the swirl generator 3 consists of a grooved rod inserted in the cleaning water supply line Lw and generates swirls in the water flowing in the cleaning water supply line Lw. Swirls are generated in order to make it easy to mix a gas (ozone-containing air with high detergency) with cleaning water in a gas-water mixer 4 which will be described later.

The gas flow line La and cleaning water supply line Lw both communicate with the mixer 4 in which the gas (ozone-containing air with high detergency) flowing from the gas flow line La and the cleaning water flowing from the cleaning water supply line Lw are mixed to prepare a cleaning fluid for cleaning the urinal 1.

The exit side of the mixer 4 is connected with one end of the cleaning fluid line Lc and the other end of the cleaning fluid line Lc is communicated with a cleaning fluid ejection hole (hereinafter called "spreader") 5 located on the upper part of the urinal 1.

The spreader 5 is located centrally in the width direction on the upper edge of the urinal 1 and designed to let the cleaning fluid flow out, for example, through two ejection holes. Here, it is also possible that the spreader 5 has a plurality of ejection holes formed so as to cover the whole width.

However, when the spreader is located centrally in the width direction on the upper edge of the urinal 1 as shown in FIG. 1, there is no need to apply a pressure to let the cleaning fluid flow out through the spreader 5, which better meets the purpose of water saving. Also, when the spreader is like the one shown in FIG. 1, it is unnecessary to provide a "flange" for preventing the cleaning fluid from "splashing," on the lateral sides of the urinal 1, which is desirable from the viewpoint of labor saving in cleaning work.

Located in the center of the front upper part (upper edge) 1a of the urinal 1 are a human body sensor 7 and a surrounding environment sensor 8 (for example, a temperature sensor, humidity sensor, odor sensor, ozone sensor, etc) which detects the surrounding environment (for example, temperature, humidity, ozone concentration and/or ammonia concentration and odor) and transmits the detection result.

The human body sensor 7 and surrounding environment sensor 8 are connected with the control unit 11 by an input signal line Si.

In FIG. 1, symbol Si2 indicates a signal line to transmit a control signal from the control unit 11 to the electromagnetic valve V1.

Next, the structure of the control unit 11 will be described referring to FIG. 2.

The control unit 11 includes an operation control block 111, an ozone generation block 112, a supply voltage determination block 113, a revolution speed determination block 114, a database 115, a timer 116, and a plurality of interfaces 117a-117e (first to fifth interfaces).

The revolution speed determination block 114 is provided in order to determine the revolution speed of the blower 12.

The first interface 117a is designed to receive information from the human body sensor 7. The first interface 117a is connected with the operation control block 11 through line L1 and with the timer 116 through line L2.

The timer 116 is connected with the operation control block through line L3. The operation control block 111 is connected with the third interface 117c through line L4.

The second interface 117b is designed to receive information from the surrounding environment sensor 8. The second interface 117b is connected with the ozone generation determination block 112 through line L5.

The ozone generation block 112 is connected with the supply voltage determination block 113 through line L6 and with the revolution speed determination block 114 through line L8.

The supply voltage determination block 113 is connected with the fourth interface 117d through line L7.

The revolution speed determination block 114 is connected with the fifth interface 117e through line L9.

The third interface 117c and fourth interface 117d are connected with the high voltage transformer 13. The fifth interface 117e is connected with the motor of the blower 12.

The database 115 is connected with the ozone generation determination block through line L10 and with the operation control block 111 through line L11 and with the supply voltage determination block 113 through line L12, and with the revolution speed determination block 114 through line L13.

When the human body sensor 7 detects a urinal user approaching the urinal 1, that information is transmitted to the operation control block 111 through the first interface 117a. At the same time, information that the user stands in front of the urinal is transmitted to the timer 116 through the interface 117a and line L2; the timer 116 begins counting the time which elapses since when the user stands in front of the urinal. The elapsed time count is transmitted to the operation control block 111 through line L3.

The operation control block 111 generates an operation control signal according to the program stored in the database 115 and the operation control signal is transmitted to the high voltage transformer 13 (FIG. 1) through the interface 117c.

The information received from the surrounding environment sensor 8, for example, information on the environment of the lavatory where the urinal 1 is installed (for example, temperature and humidity) is transmitted to the ozone generation determination block 112 through the second interface 117b and line L5. The ozone generation determination block 112 calculates an adequate quantity of ozone to be generated according to a map stored in the database 115.

The ozone generation quantitative data calculated by the ozone generation determination block is transmitted to the supply voltage determination block 113 through line L6 and to the revolution speed determination block 114 through line L8.

The supply voltage determination block 113 calculates the voltage to be supplied to the ozonizer 14 (FIG. 1) according to the ozone generation quantitative data and the map sent from the database 115 and the calculated voltage to be supplied to the ozonizer 14 is transmitted to the high voltage transformer 13 (FIG. 1) through line L7 and interface 117d.

The revolution speed determination block 114 applies the ozone generation quantitative data to the map sent from the database 115 and calculates the revolution speed of the motor of the blower 12. The revolution speed calculated by the revolution speed determination block 114 is transmitted to the blower 12 (FIG. 1) through line L9 and interface 117e.

Next, control operation in the urinal (system) A will be explained referring to FIGS. 3 to 12.

FIG. 3 shows a control sequence in a stage (waiting period) before occurrence of an event.

Here, an "event" is thought to correspond to one of the following seven cases:

a standard case that the user uses the urinal (FIG. 4);
a case that the urinal is successively used (FIG. 5)
a case that maintenance cleaning is performed automatically (FIG. 6);
a case that cleaning is performed manually (case of maintenance cleaning) (FIG. 7);
a case of abnormality except electric power failure (FIG. 8);
an electric power failure (FIG. 9); and
a case that various settings are altered (FIG. 10).

First, the control sequence in the stage (waiting period) before occurrence of an event is explained.

In FIG. 3, the period from when the power is turned ON (Step S1) until the user stands in front of the urinal 1 is a waiting period (Step S2).

During waiting, for example, the temperature and humidity of a place (men's toilet) in which the urinal 1 is installed, as data on its environment, are measured (Step S3) and a decision is made as to whether any of the above events has occurred (Step S4).

At Step S3, the current room environment is measured and determined using various sensors, and preliminary efflux time/concentration of ozone air (ozone-containing air flowing out of the spreader 5: hereinafter so called in this specification), ozone water running time/concentration, and ex-post efflux time/concentration of ozone air are determined in multi-map mode.

For the ozone concentration (oxidation/decomposition speed), a constant value is given in advance in order to identify a position on the map, according to temperature, humidity and time elapsed.

If the above event occurs (YES at Step S4), the system proceeds to Step S5; if not (NO at Step S4), Step S2 and subsequent steps are repeated.

At Step S5, a control sequence suitable for the event which has occurred, namely one of the control sequences shown in FIGS. 4 to 12, is carried out.

FIG. 4 shows a standard control sequence for the case that a user uses the urinal.

The control sequence shown in FIG. 4 begins from the step expressed as "Step S5 in FIG. 3" in FIG. 4.

In the control sequence in FIG. 4, the human body sensor 7 detects that a user stands in front of the urinal 1 (Step S11).

At Step S12, a decision is made as to whether 120 seconds or more have elapsed since the end of the last ozone air efflux in the previous use of the urinal 1.

If 120 seconds or more have elapsed (YES at Step S12), the system proceeds to Step S14; if 120 seconds have not elapsed (NO at Step S12), the control sequence shown in FIG. 5 (described later) is carried out (Step S13).

At Step S14, standard cleaning starts and continues for two seconds (loop at Step S15).

If two seconds have elapsed after start of standard cleaning (YES at Step S15), ozone air flows out for 2 to 60 seconds (first specified time) (Step S16). In this description, ozone air efflux at Step S16 is referred to as "preliminary efflux of ozone air."

At Step S17, the system detects that the user has left the urinal 1. After detecting the user's walk-off at Step S17, the system waits 0.5 second (loop at Step S18); after 0.5 second has elapsed (YES at Step S18), cleaning with running ozone water (ozone water: cleaning water mixed with ozone air, hereinafter so called) is carried out for 3 to 5 seconds (second specified time) (Step S19).

As in the case of FIG. 5, when the urinal 1 is used successively, the quantity of cleaning water which is used each time may be decreased.

After cleaning with running ozone water at Step S19 is ended, the system waits 5 to 10 seconds (NO at Step S20). If 5 to 10 seconds have elapsed after the end of cleaning with running ozone water at Step S19 (YES at Step S20), ozone air flows out of the spreader 5 for 1 to 5 seconds (Step S21). In this description, ozone air efflux at Step S21 is referred to as ex-post efflux. After ex-post efflux at Step S21, the system proceeds to R1 in FIG. 3.

In the control sequence shown in FIG. 4, namely the standard control sequence for the case that the user uses the urinal, air mixed with ozone with high detergency is supplied from the spreader 5 on the upper part of the urinal 1 in a way to overflow to an area around the urinal 1 at Step S16 for the preliminary efflux of ozone air. Therefore, even when urine hits against the urinal 1 and droplets of urine scatter, the droplets of urine inevitably contact the gas (ozone air) with high detergency flowing out of the spreader 5 and become unlikely to give off a bad smell (for example, as a result of oxidation), thereby ensuring that emission of an offensive odor caused by urine splashed around the urinal 1 does not occur.

In addition, since cleaning water used for cleaning with ozone water at Step S19 contains ozone with high detergency (oxidation ability), when cleaning water used to clean the urinal 1 flows in the drain pipe line, ozone also flows in the drain pipe line; therefore, urine stones which might accumulate in the drain pipe line can be washed and decomposed. This suppresses accumulation or growth of urine stones in the drain pipe line and thus prevents clogging of the drain pipe line.

In addition, since cleaning water contains ozone with high detergency (oxidation ability), the consumption of cleaning water can be decreased (water saving) while the required wetted area is guaranteed.

Furthermore, after the user's walk-off, ex-post efflux of ozone air induces reaction (oxidation) of urine droplets scattered around the urinal 1 to prevent them from emitting an offensive odor and also ensures that the area around the urinal 1 is sterilized.

FIG. 5 shows a control sequence for the case that the urinal 1 is used successively.

The control sequence shown in FIG. 5 begins from the step expressed as "Step S13 in FIG. 4" in FIG. 5. The control sequence for cleaning is started at Step S31.

The system waits for two seconds after Step S13 in FIG. 4 ("NO" loop at Step S32) and upon elapse of two seconds (YES at Step S32), ozone air preliminarily flows out of the spreader 5 of the urinal 1 for 2 to 60 seconds (Step S33).

As the system detects at Step S34 that the user has left the urinal 1, the system waits 0.5 second after the detection ("NO" loop at Step S35). When 0.5 second has elapsed after the user leaves the urinal 1 (YES at Step S35), cleaning with running ozone water is carried out for 1 to 2 seconds (Step S36).

After the end of cleaning with running ozone water (Step S36) the system waits 5 to 10 seconds ("NO" loop at Step S37) and when 5 to 10 seconds have elapsed (YES at Step S37), ex-post efflux of ozone air (refer to illustration of Step 16 in FIG. 4) continues for 1 to 5 seconds (Step S38). After the end of ex-post efflux of ozone air, the system proceeds to R2 in FIG. 3.

The effect of the control sequence shown in FIG. 5 (control sequence for the successive use of the urinal) is the same as that of the standard control sequence in FIG. 4 for the use of the urinal by a user.

Here, in the case of FIG. 5, since cleaning of the urinal 1 with cleaning water is successively carried out after a short time interval, it is expected that the urinal 1 is cleaned sufficiently even with a smaller quantity of cleaning water.

FIG. 6 explains a control sequence for automatic maintenance cleaning.

The control sequence shown in FIG. 6 begins from the step expressed as "Step S5 in FIG. 3."

At Step S41 in FIG. 6, a decision is made as to whether the urinal 1 has been unused for 4 to 8 hours or not. If the urinal 1 has been unused for 4 to 8 hours (YES at Step S41), the system proceeds to S42. If the urinal 1 has not been unused for 4 to 8 hours (NO at Step S41), the system returns to Step S5 in FIG. 3 and waits ready ("NO" loop at Step S41).

Maintenance cleaning is started at Step S42. In maintenance cleaning, ozone air flows out of the spreader 5 of the urinal 1 for 2 to 60 seconds (Step S43: preliminary efflux). After the preliminary efflux of ozone air at Step S43, cleaning with running ozone water is carried out for 1 to 5 seconds (Step S44). Then, the system proceeds to R1 in FIG. 3.

In automatic maintenance cleaning shown in FIG. 6 as well, the urinal 1 and its vicinity are kept clean by preliminary efflux of ozone air and cleaning with running ozone water.

FIG. 7 explains a control sequence for the case that the urinal 1 is cleaned manually, for example, by a worker (maintenance cleaning).

The control sequence shown in FIG. 7 also begins from the step expressed as "Step S5 in FIG. 3" in FIG. 7.

In FIG. 7, the manual button is pushed at Step S51. Maintenance cleaning is started (Step S52) and cleaning is carried out with an efflux of cleaning water not mixed with ozone, for 1 to 5 seconds (Step S53). Then the system proceeds to R1 in FIG. 3.

In manual cleaning of the urinal 1, a cleaning agent or the like is often used and in most cases, it is unnecessary to mix the cleaning water with ozone which has high detergency; for this reason, cleaning water is not mixed with ozone.

FIG. 8 explains a control sequence for the case that an abnormality except a power failure has occurred.

The control sequence shown in FIG. 8 also begins from the step expressed as "Step S5 in FIG. 3" in FIG. 8.

In FIG. 8, at Step S61, the system detects an abnormality (for example, water running does not begin after the end of urination or cleaning water does not stop flowing out, etc). Then a warning sound is produced and a failure mode warning appears on a monitor (not shown) (Step S62).

At Step S63, the detected abnormal condition is classified by mode and counted as an abnormality and the information on the detected abnormal condition is stored, for example, in the database 115 (see FIG. 2). Then the system ceases its operation for a specified period (Step S64) and proceeds to R1 in FIG. 3.

By carrying out the control sequence in FIG. 8, modes of abnormalities except power failures can be statistically grasped so that the cause of a failure can be identified easily and a remedial action can be quickly taken. In development of systems in the future, data which will contribute to further performance enhancement can be accumulated.

FIG. 9 explains a control sequence for the case of a power failure.

The control sequence shown in FIG. 9 begins from the step expressed as "Step S5 in FIG. 3" in FIG. 9.

In FIG. 9, a power failure is detected at Step S71 and a notice of the fact that power failure is underway (Step S72) is visually given on the monitor (not shown) (Step S73).

At Step S74, for example, an auxiliary power supply or the like (not shown) is used to ensure that the system operates for a given time period. After the given time period has elapsed, the system stops operating (Step S75).

In the control sequence for the case of a power failure in FIG. 9, since operation of the system within a given time period is ensured, minimum cleaning required to keep the urinal hygienic is carried out.

Also, even if a power failure occurs during efflux of cleaning water, cleaning water is prevented without fail. The same is true for a power failure during efflux of ozone air.

FIG. 10 shows a control sequence for the case that various settings (for example, water running time) are altered.

The control sequence shown in FIG. 10 also begins from the step expressed as "Step S5 in FIG. 3" in FIG. 10.

In FIG. 10, as the set button is pushed (Step S81), the current setup data is displayed (Step S82).

At Step S83, the worker or manager decides whether to alter the setup data or not.

If the setup data should be altered (YES at Step S3), the system proceeds to Step S84; if it should not be altered (NO at Step S83), the system proceeds to R1 in FIG. 3.

At Step S84, the worker or manager enters new setting data to replace old setting data, by an input means (not shown). The entered setting data is stored in the database 115 (Step S85) and the system proceeds to R1 in FIG. 3.

By utilizing the control sequence for altering various settings (for example, water running time) shown in FIG. 10, various settings can be improved for various purposes such as further water saving and $CO_2$ emission reduction.

FIG. 11 shows a first variation of the first embodiment.

While only the control unit 11 of the control section 10 is provided as a controller in the system of FIG. 1, a second control unit 11A is added in the first variation shown in FIG. 11.

The second control unit 11A receives a detection signal from the human body sensor 7 through signal line Si3. A control signal is transmitted from the second control unit 11A to the electromagnetic valve V1 through signal line Sit.

The second control unit 11A uses an accumulator 9A such as a battery as its driving power source In the control sequence for a power failure as illustrated in FIG. 9 where operation of the system is guaranteed within a given time period at Step S74, even in the case of a power failure, the second control unit 11A, which is powered by the accumulator 9A (for example, battery: equivalent to an auxiliary power supply), guarantees minimum required operation of the urinal system (supply and drainage of cleaning water).

The data obtained during a power failure is sent from the second control unit 11A to the control unit 11 through communication line NW1 described below.

In FIG. 11, symbol NW1 represents a communication system for exchange of necessary information between the first control unit 11 and second control unit 11A.

The communication system NW1 is not only a signal cable but may be an infrared wireless communication system including an infrared signal generator and an infrared signal receiver or a system in which signals are exchanged through the intermediation of an operator using an exclusive remote control terminal or mobile computer. In other words, the communication system for exchange of necessary information between the first control unit 11 and second control unit 11A is not limited.

The rest of the configuration and its operation and effect in the first variation shown in FIG. 11 are the same as those described referring to FIGS. 1 and 10.

FIG. 12 shows a second variation of the first embodiment.

In FIG. 1, the control section 10 which includes the control unit 11 is located on the ozonizer 14 side. On the other hand, in the second variation in FIG. 12, a control section 10B is located in the cleaning water supply line Lw with an electromagnetic valve V1 inserted and a control unit 11B is located in the control section 10B.

The control section 10B is designed to be powered by an AC power supply 9 (for example, a commercial power supply).

The human body sensor 7 and surrounding environment sensor 8 are connected with the control unit 11B through input signal line Si.

The control unit 11B controls start and stop of the blower 12 and the revolution speed of the blower motor through signal line Si4 and also operates the high voltage transformer 13 through signal line Si5 to control high voltage current supply to the ozonizer 14.

The rest of the configuration and its operation and effect in the second variation shown in FIG. 12 are the same as those described referring to FIGS. 1 and 10.

Next, a second embodiment will be described referring to FIGS. 13 and 15.

In FIG. 13, symbol B represents a whole system including the urinal 1.

In the first embodiment shown in FIGS. 1 to 12, ozone is generated by the ozonizer 14 and mixed with air. On the other hand, in the second embodiment shown in FIG. 13, chemical stored in a chemical tank 14B is evaporated and mixed with air.

Here, for example, stabilized chlorine (C14), oil essences of various evaporated chemicals, and herb, catechin, flavonoid, parabole and the like in the gaseous phase may be used as the chemical.

In FIG. 13, an electric heater 13B is used as a means to evaporate the chemical stored in the chemical tank 14B. The chemical supply flow rate is controlled by controlling the electric power supplied to the heater 13B and/or the revolution speed of the blower motor for the blower 12 by the control unit 11.

Here, a semiconductor heater may be used as the heater 13B.

In the second embodiment, a chemical supply flow rate determination block replaces the first embodiment's ozone generation quantity determination block 112 in FIG. 2. When expressed by a functional block diagram, the ozone generation quantity determination block and the chemical supply flow rate determination block are equivalent to each other. Therefore, the block diagram of the control unit 11 in the second embodiment in FIG. 11 is almost the same as that in FIG. 2.

Furthermore, in the block diagram of the first embodiment (FIG. 2), a voltage signal concerning the voltage determined by the supply voltage determination block 113 is transmitted to the high voltage transformer 13. On the other hand, in the second embodiment in FIG. 11, a power signal concerning the power determined by the supply power supply block is supplied to the electric heater 13B.

In the second embodiment in FIG. 13, as a gas with high detergency, ozone in the first embodiment is replaced by one of the following: stabilized chlorine ($Cl_4$), oil essences of various evaporated chemicals, and herb, catechin, flavonoid, parabole and the like in the gaseous phase.

The rest of the configuration and its operation and effect in the second embodiment are almost the same as those in the first embodiment.

FIG. 14 shows a first variation of the second embodiment.

The first variation in FIG. 14 corresponds to the configuration of the first variation of the first embodiment as shown in FIG. 11.

In other words, the first variation in FIG. 14 includes a second control unit 11A where the second control unit 11A is responsible for control of the electromagnetic valve V1 and control in case of a power failure (see FIG. 9).

The rest of the configuration and its operation and effect in FIG. 14 are the same as in the embodiment in FIG. 13 and the variation in FIG. 11.

FIG. 15 shows a second variation of the second embodiment.

The second variation in FIG. 15 corresponds to the configuration of the second variation of the first embodiment as shown in FIG. 12.

In other words, in the second variation in FIG. 15, a control section 10B is located in the cleaning water supply line Lw with an electromagnetic valve V1 inserted and a control unit 11B is located in the control section 10B.

The rest of the configuration and its operation and effect in FIG. 15 are the same as in the embodiment in FIG. 13 and the variation in FIG. 12.

Next, a third embodiment will be described referring to FIG. 16. In the third embodiment, symbol A represents a whole system including the urinal 1 as shown in FIG. 1 and symbol C represents a whole network system including the system A.

The third embodiment in FIG. 16 assumes adoption of the system A including the urinal 1 (FIGS. 1 to 12) in the first embodiment and/or the system B in the second embodiment (FIGS. 13 to 15) and uses a management server 300 to manage, in a centralized manner, quantitative data concerning water savings and $CO_2$ emission reductions by adoption of the system A and/or system B.

Here, although FIG. 16 only shows the system A according to FIGS. 1 to 10, the variations in FIGS. 11 and 12 and the system B in FIGS. 13 to 15 may also be used.

In FIG. 16 showing the configuration of the third embodiment, data is transmitted from the urinal (system A) through the Internet 200 to the management server 300; however, instead a local area network (LAN) may be used for data transmission. Alternatively, an exclusive signal transmission line may be used.

Besides, although not shown, it is also possible that data is picked up from each urinal by means of a mobile terminal and the data on the urinal as stored in the mobile terminal is sent to the management server 300 (through the mobile terminal).

According to the above urinal system C in the third embodiment, since quantitative data concerning water savings and $CO_2$ emission reductions by adoption of the urinal 1 of the first embodiment and/or the second embodiment are managed in a centralized manner using the management server 300, for example, the threshold limit for water saving (quantity of water which can be saved without impairing the urinal cleaning function) can be calculated. Therefore, further water saving and $CO_2$ emission reduction can be achieved.

The embodiments shown in the figures are for illustrative purposes only and their descriptions are not intended to limit the technical scope of the present invention.

For example, the illustrated embodiments are applied to the urinal 1 which has a spreader 5; however, the present invention can be applied to a urinal that does not have a spreader. If that is the case, air mixed with ozone and cleaning water mixed with ozone are ejected through a plurality of washing fluid ejection holes located on the upper edge of the urinal.

Another possible approach is that an alcohol sensor or aldehyde sensor as an environmental sensor is provided to switch the system to a control mode for drunk users on the assumption that if the user of a men's toilet is badly drunk, the user discharges a larger quantity of urine and uses the urinal for a longer time.

Furthermore, considering that how often the urinal is used differs among time zones of the day and between weekends and weekdays, it is also possible that a member which functions as a clock and calendar is provided in the control section 10, 10B and different operation modes are preset for different time zones or weekdays and holidays or weekends so that the operation mode is automatically changed depending on the time and date (including the day of the week).

EXPLANATION OF REFERENCE NUMERALS AND SYMBOLS

Figure 1:
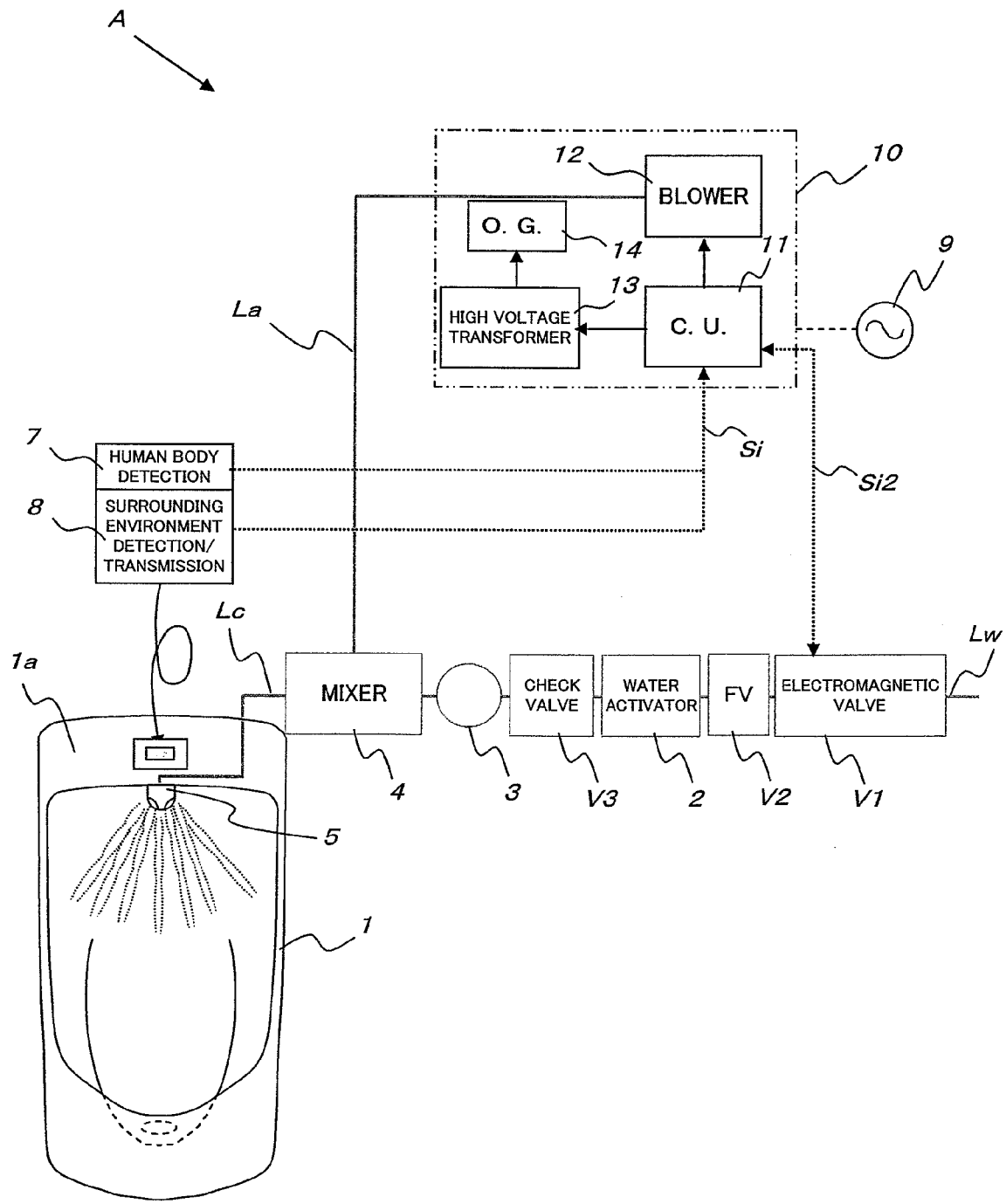
FIG. 1 is a block diagram showing the general configuration of a first embodiment of the present invention.
Figure 2:
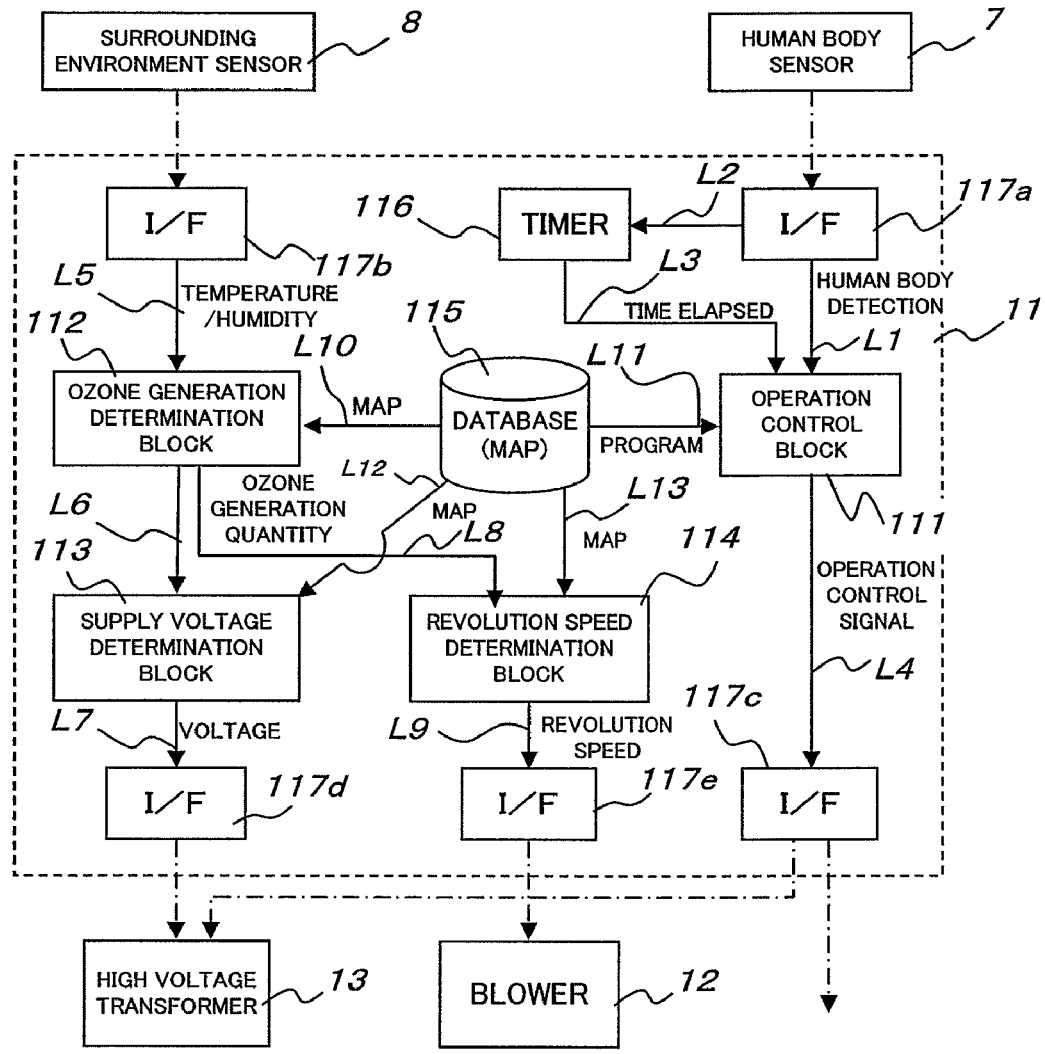
FIG. 2 is a block diagram showing the structure of the control unit of the first embodiment.
Figure 4:
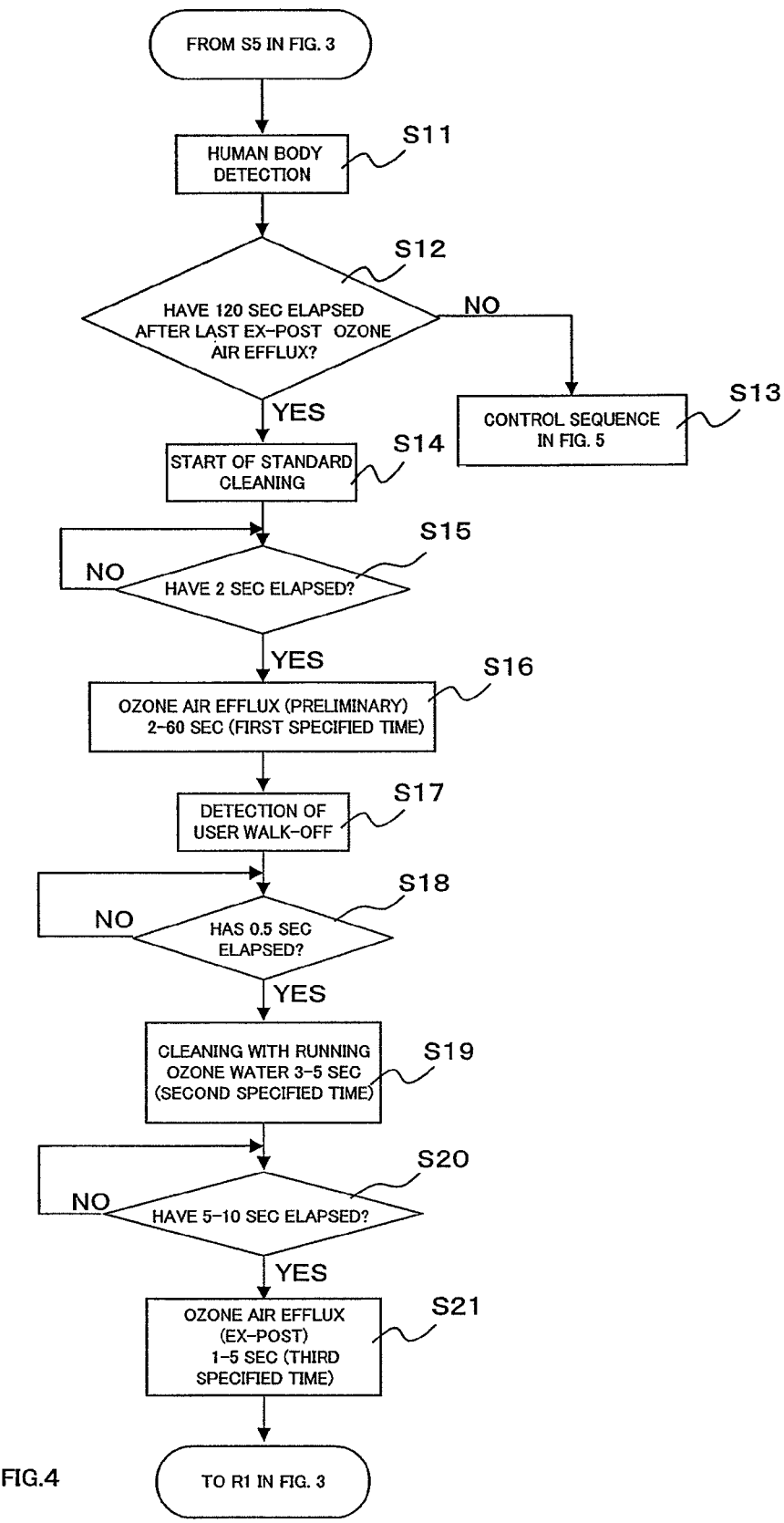
FIG. 4 is a flowchart showing a standard control sequence in the first embodiment for the case that a user uses the urinal.
Figure 5:
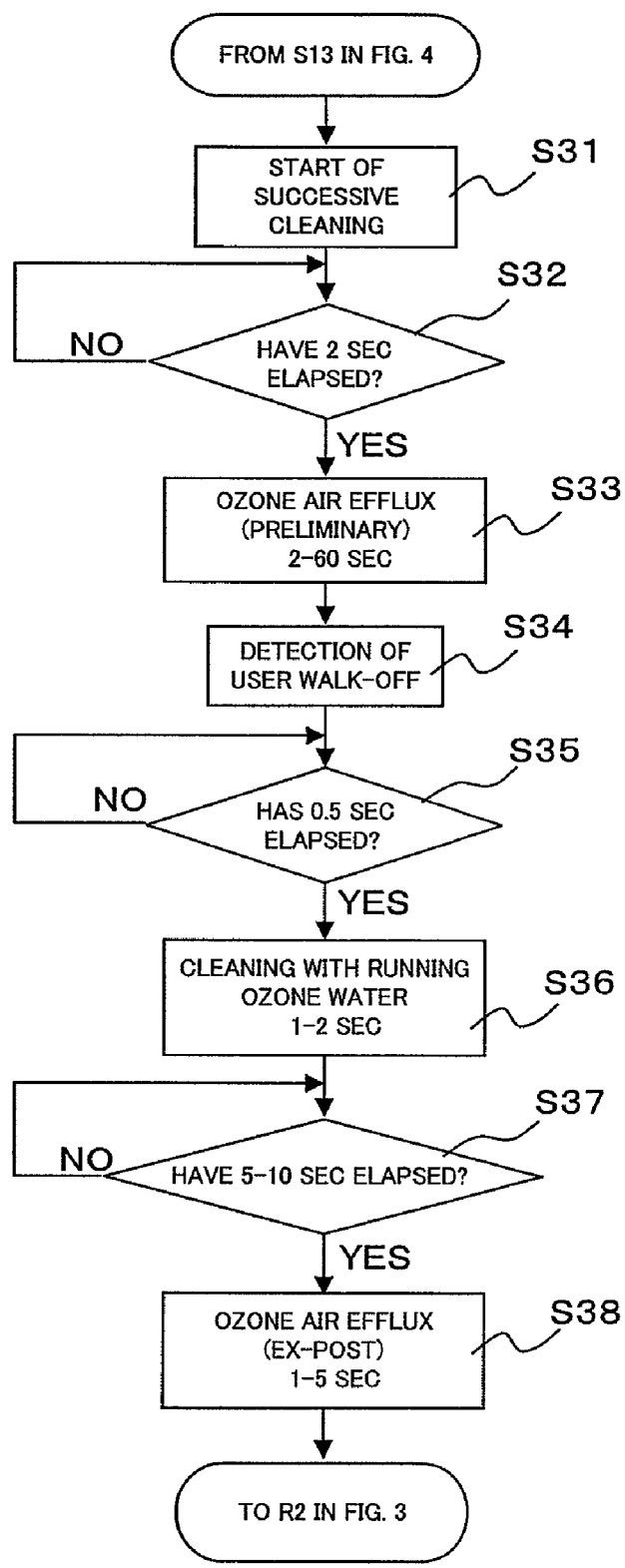
FIG. 5 is a flowchart showing a control sequence in the first embodiment for the case that the urinal is used successively.
Figure 6:
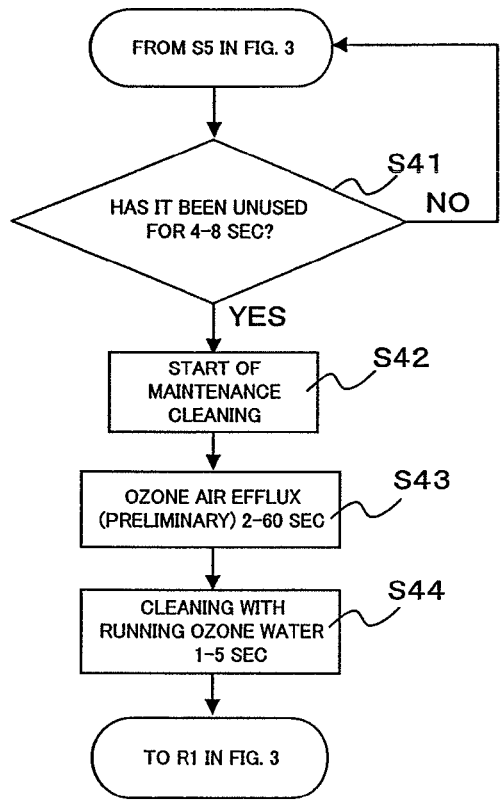
FIG. 6 is a flowchart showing a control sequence in the first embodiment for the case that maintenance cleaning is performed automatically.
Figure 7:
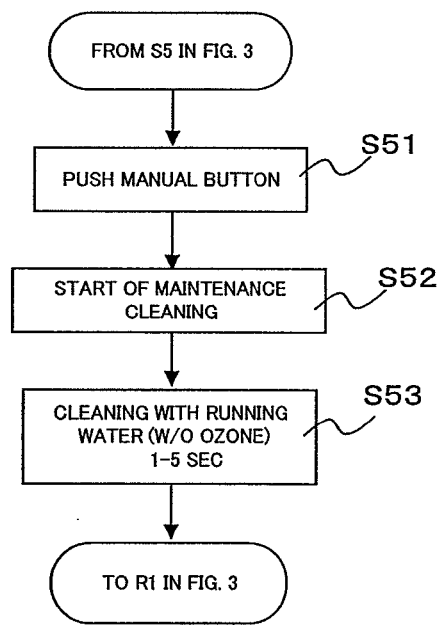
FIG. 7 is a flowchart showing a control sequence in the first embodiment for the case that a worker does cleaning.
Figure 8:
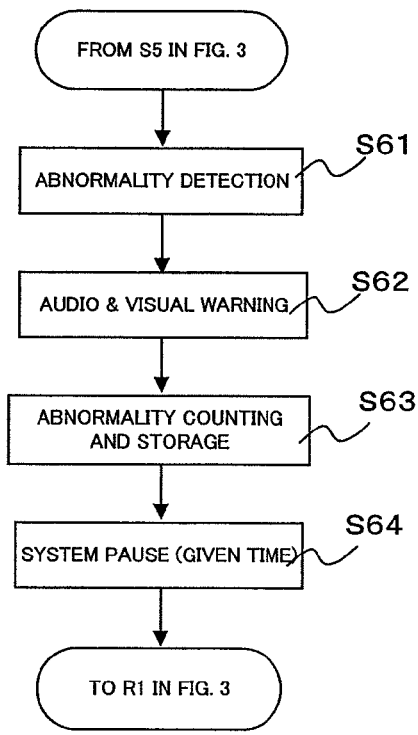
FIG. 8 is a flowchart showing a control sequence in the first embodiment for an abnormality except a power failure.
Figure 9:
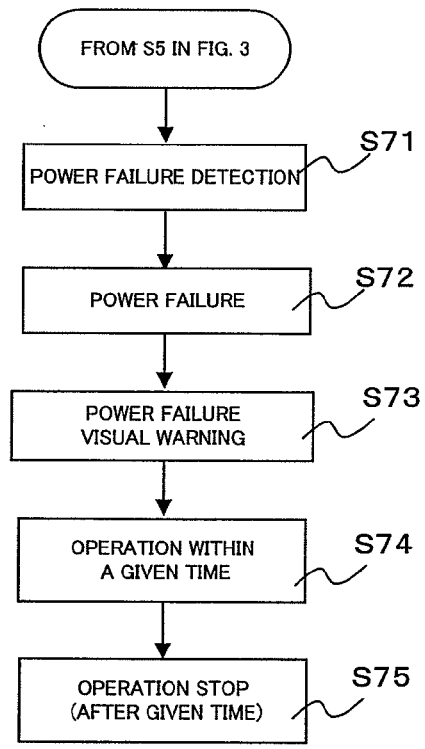
FIG. 9 is a flowchart showing a control sequence in the first embodiment for a power failure.

1 ... Urinal (main body)
2 ... Water activator
3 ... Swirl generator
4 ... Mixer
5 ... Cleaning fluid ejection hole
7 ... Human body sensor
8 ... Surrounding environment sensor
9 ... Commercial power supply/AC power supply
10, 10B ... Control section
11, 11A, 11B ... Control unit
12 ... Blower
13 ... High voltage transformer
14 ... Ozone generator/ozonizer
111 ... Operation control block
112 ... Ozone generation determination block
113 ... Supply voltage determination block
114 ... Revolution speed determination block
115 ... Database
La ... Gas flow line
Lc ... Cleaning fluid supply line
Lw ... Cleaning water supply line
FIG. 1
12 BLOWER
13 HIGH VOLTAGE TRANSFORMER
7 HUMAN BODY DETECTION
8 SURROUNDING ENVIRONMENT DETECTION/TRANSMISSION
4 MIXER
V3 CHECK VALVE
2 WATER ACTIVATOR
V1 ELECTROMAGNETIC VALVE
FIG. 2
7 HUMAN BODY SENSOR
8 SURROUNDING ENVIRONMENT SENSOR
12 BLOWER
13 HIGH VOLTAGE TRANSFORMER
人体検知 HUMAN BODY DETECTION
116 TIMER
経過時間 TIME ELAPSED
温度・湿度 TEMPERATURE/HUMIDITY
112 OZONE GENERATION DETERMINATION BLOCK
オゾン発生 OZONE GENERATION QUANTITY
115 DATABASE (MAP)
マップ MAP
プログラム A PROGRAM
111 OPERATION CONTROL BLOCK
運転制御信号 OPERATION CONTROL SIGNAL
113 SUPPLY VOLTAGE DETERMINATION BLOCK
電位 VOLTAGE
114 REVOLUTION SPEED DETERMINATION BLOCK
回転数 REVOLUTION SPEED
FIG. 3
電源 OFF POWER OFF
S1 POWER ON
S2 WAITING
S3 ENVIRONMENT MEASUREMENT
S4 HAS AN EVENT OCCURRED?
S5 ONE OF CONTROL SEQUENCES (FIG. 4-10) IS FOLLOWED FOR THE EVENT.
注: R1, R2 は他の制御フロー チャートの最終工程が引き継がれる位置 (工程) NOTE: R1 AND R2 INDICATE POINTS (STEPS) WHICH FOLLOW THE FINAL STEPS OF OTHER CONTROL FLOWCHARTS.
FIG. 4
図 3 の S5 から FROM S5 IN FIG. 3
S11 HUMAN BODY DETECTION
S12 HAVE 120 SEC ELAPSED AFTER LAST EX-POST OZONE AIR EFFLUX?
S13 CONTROL SEQUENCE IN FIG. 5
S14 START OF STANDARD CLEANING
S15 HAVE 2 SEC ELAPSED?
S16 OZONE AIR EFFLUX (PRELIMINARY) 2-60 SEC (FIRST SPECIFIED TIME)
S17 DETECTION OF USER WALK-OFF
S18 HAS 0.5 SEC ELAPSED?
S19 CLEANING WITH RUNNING OZONE WATER 3-5 SEC (SECOND SPECIFIED TIME)
S20 HAVE 5-10 SEC ELAPSED?
S21 OZONE AIR EFFLUX (EX-POST) 1-5 SEC (THIRD SPECIFIED TIME)
図 3 の R1 へ TO R1 IN FIG. 3
FIG. 5
図 4 の S13 から FROM S13 IN FIG. 4
S31 START OF SUCCESSIVE CLEANING
S32 HAVE 2 SEC ELAPSED?
S33 OZONE AIR EFFLUX (PRELIMINARY) 2-60 SEC
S34 DETECTION OF USER WALK-OFF
S35 HAS 0.5 SEC ELAPSED?
S36 CLEANING WITH RUNNING OZONE WATER 1-2 SEC
S37 HAVE 5-10 SEC ELAPSED?
S21 OZONE AIR EFFLUX (EX-POST) 1-5 SEC
図 3 の R2 へ TO R2 IN FIG. 3
FIG. 6
図 3 の S5 から FROM S5 IN FIG. 3
S41 HAS IT BEEN UNUSED FOR 4-8 SEC?
S42 START OF MAINTENANCE CLEANING
S43 OZONE AIR EFFLUX (PRELIMINARY) 2-60 SEC
S44 CLEANING WITH RUNNING OZONE WATER 1-5 SEC
図 3 の R1 へ TO R1 IN FIG. 3
FIG. 7
図 3 の S5 から FROM S5 IN FIG. 3
S51 PUSH MANUAL BUTTON
S52 START OF MAINTENANCE CLEANING
S53 CLEANING WITH RUNNING WATER (W/O OZONE) 1-5 SEC
図 3 の R1 へ TO R1 IN FIG. 3
FIG. 8
図 3 の R5 から FROM S5 IN FIG. 3
S61 ABNORMALITY DETECTION
S62 AUDIO & VISUAL WARNING
S63 ABNORMALITY COUNTING AND STORAGE
S64 SYSTEM PAUSE (GIVEN TIME)
図 3 の R1 へ TO R1 IN FIG. 3
FIG. 9
図 3 の S5 から FROM S5 IN FIG. 3
S71 POWER FAILURE DETECTION
S72 POWER FAILURE
S73 POWER FAILURE VISUAL WARNING
S74 OPERATION WITHIN A GIVEN TIME
S75 OPERATION STOP (AFTER GIVEN TIME)

Figure 3:
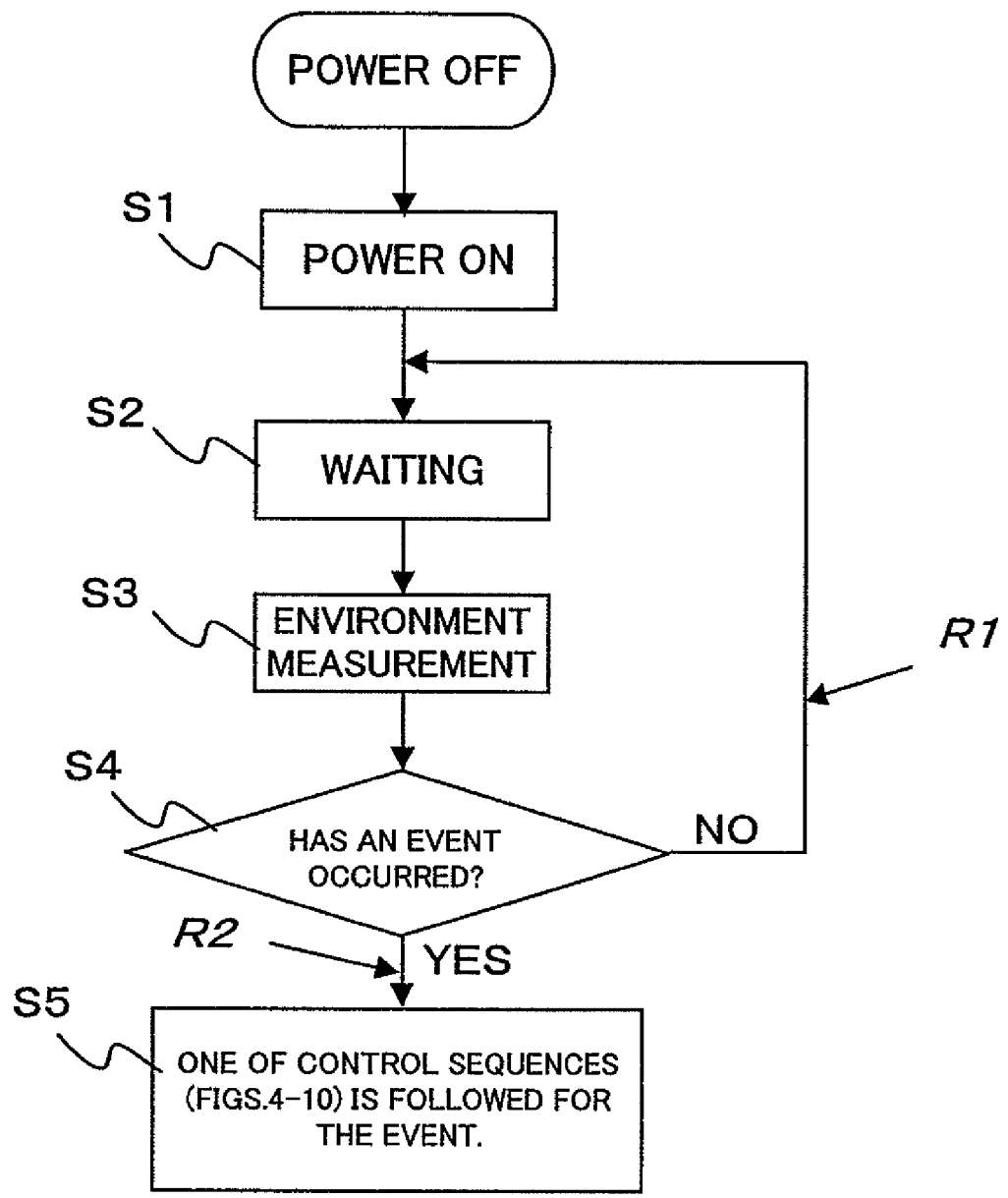
FIG. 3 is a flowchart showing a control sequence in a stage before occurrence of an event in the first embodiment.
Figure 10:
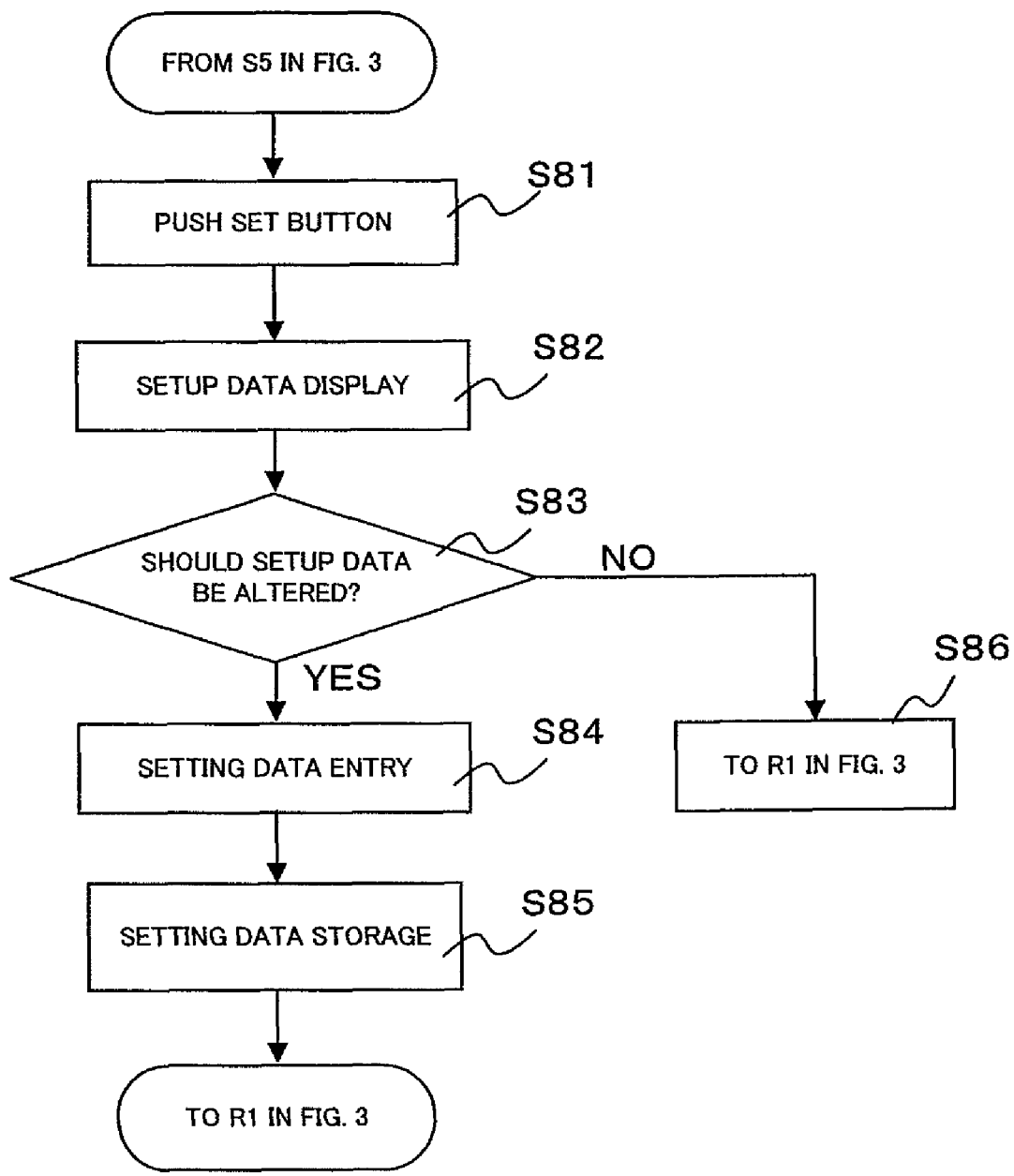
FIG. 10 is a flowchart showing a control sequence in the first embodiment for the case that various settings are altered.
Figure 11:
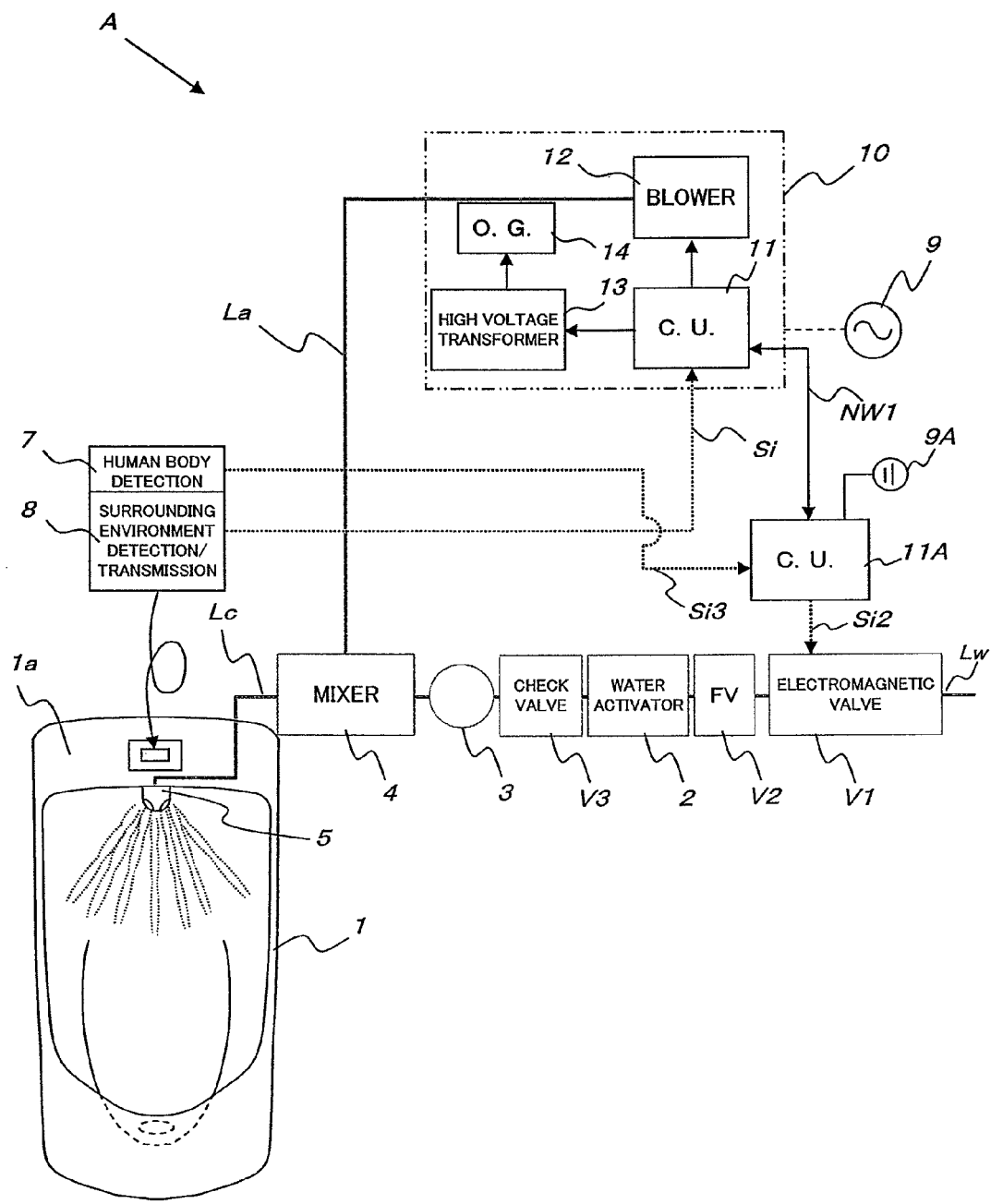
FIG. 11 is a block diagram showing the configuration of a first variation of the first embodiment.
Figure 12:
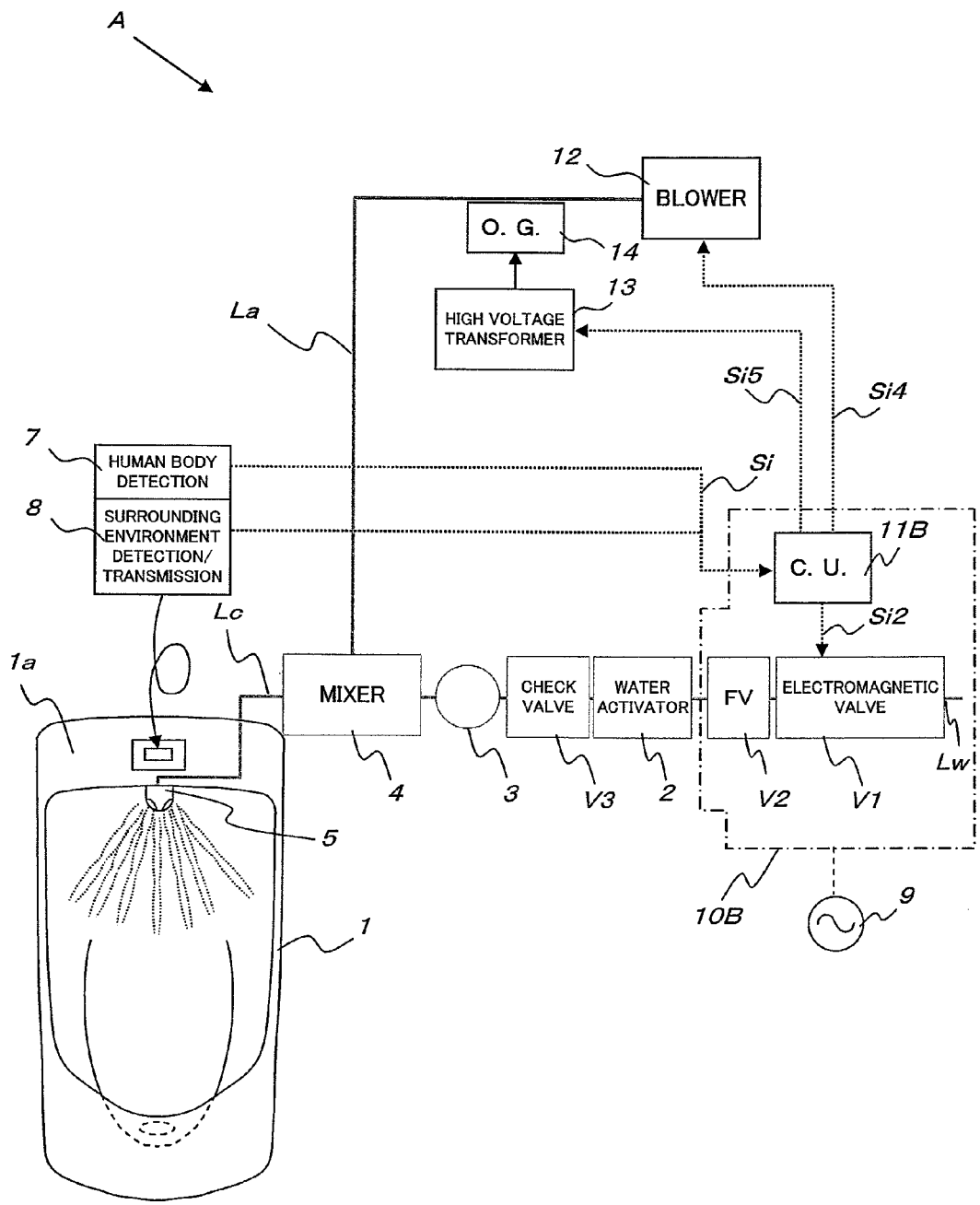
FIG. 12 is a block diagram showing the configuration of a second variation of the first embodiment.
Figure 13:
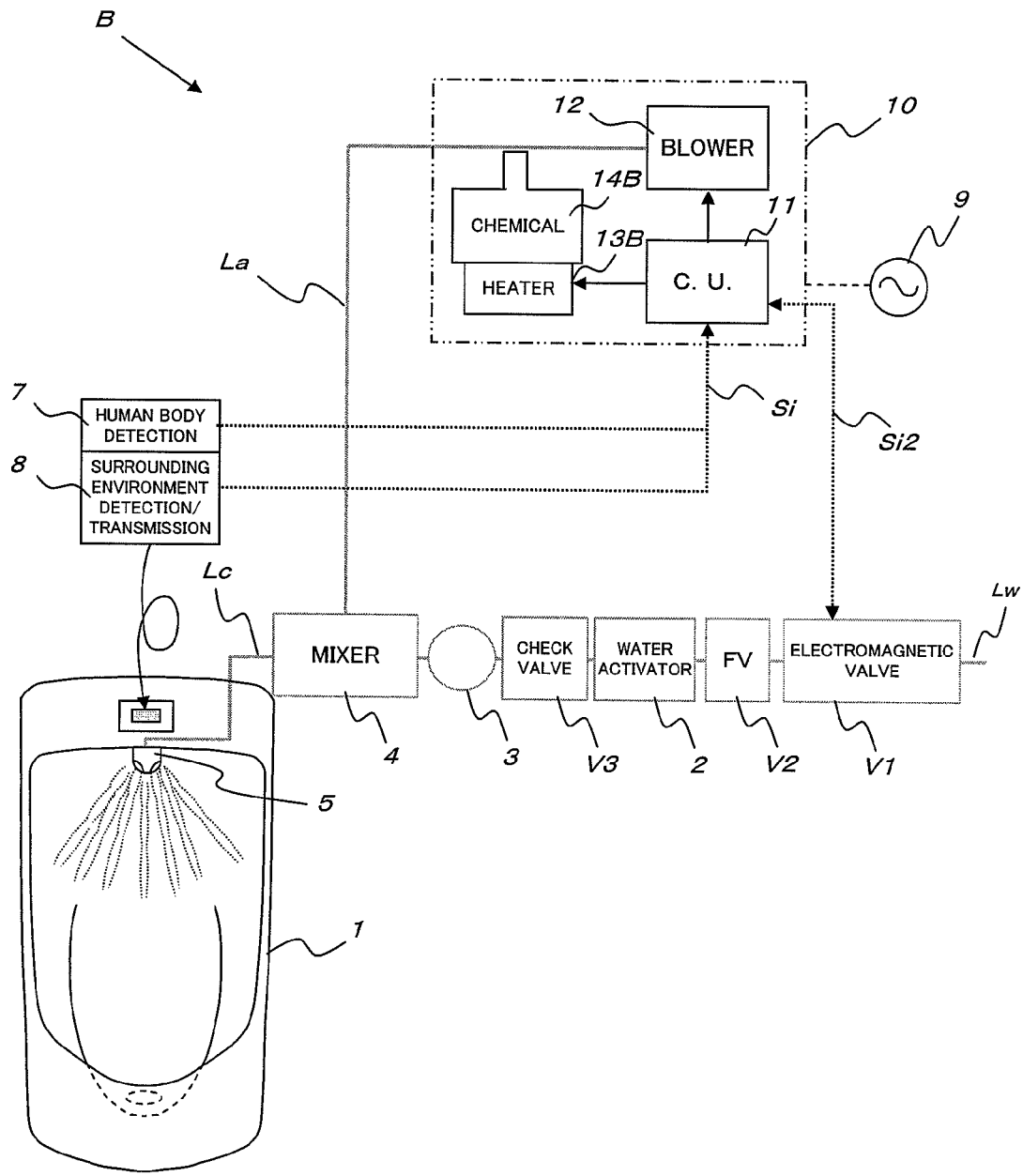
FIG. 13 is a block diagram showing the general configuration of a second embodiment.
Figure 14:
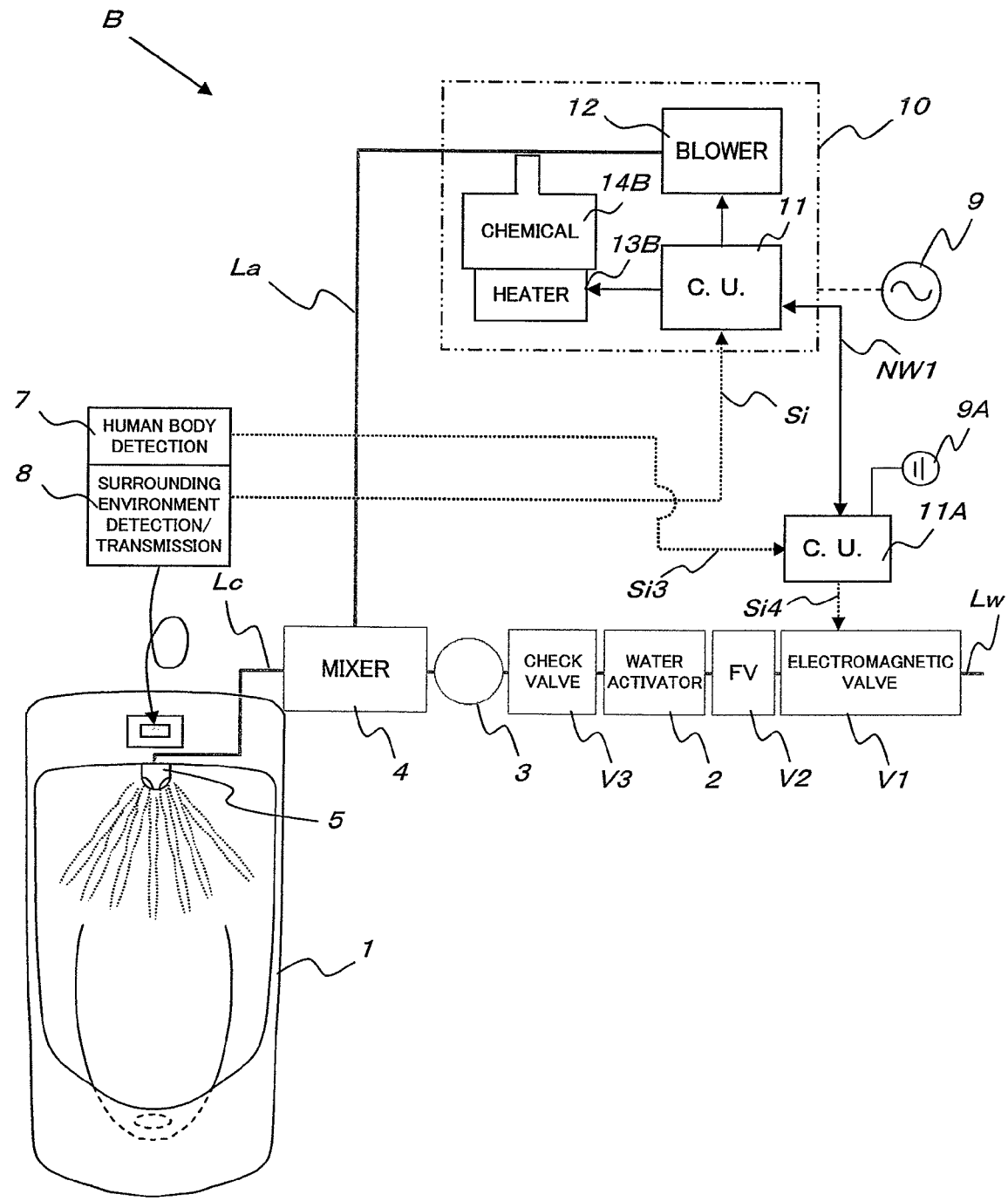
FIG. 14 is a block diagram showing the configuration of a first variation of the second embodiment.
Figure 15:
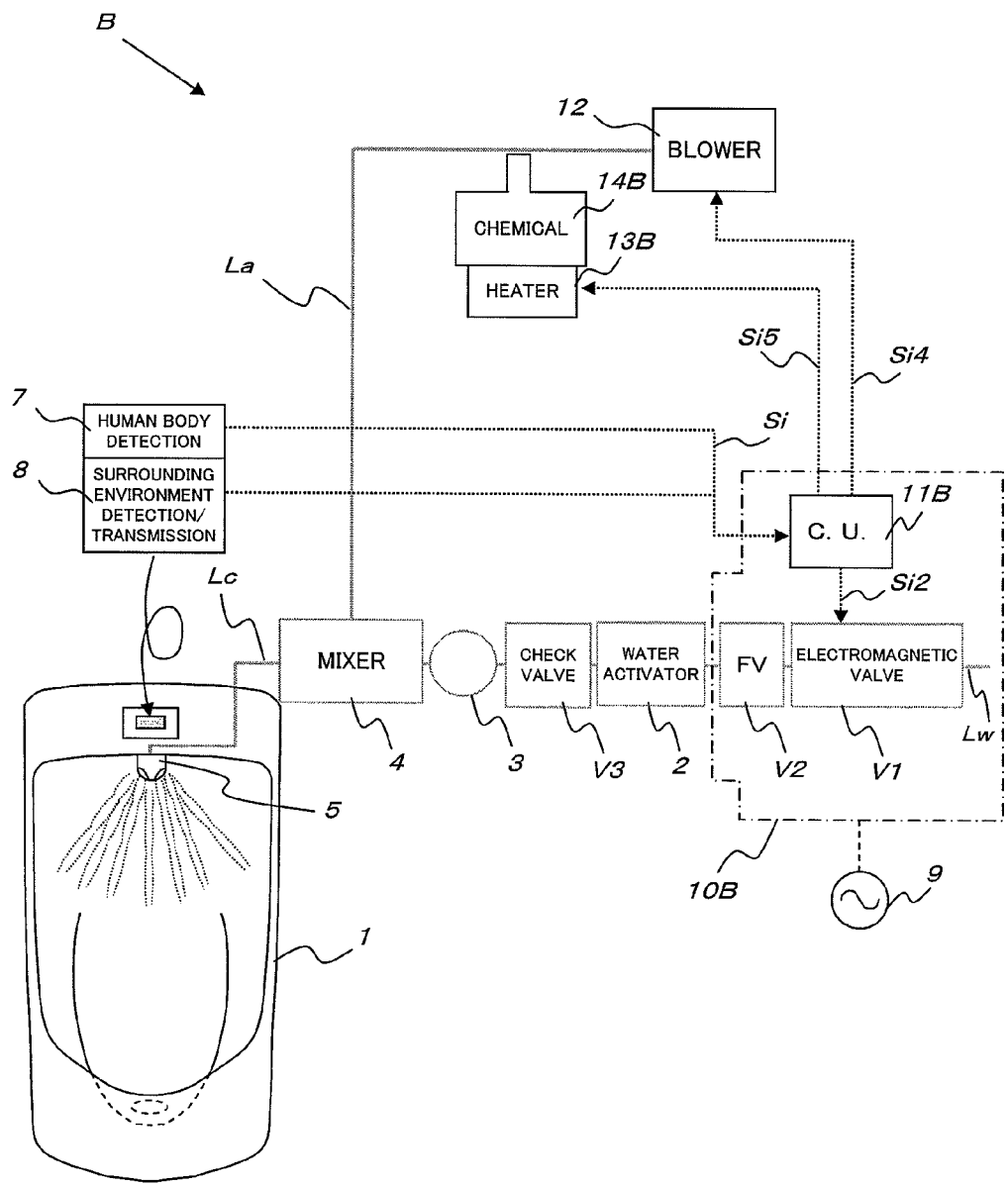
FIG. 15 is a block diagram showing the configuration of a second variation of the second embodiment.
Figure 16:
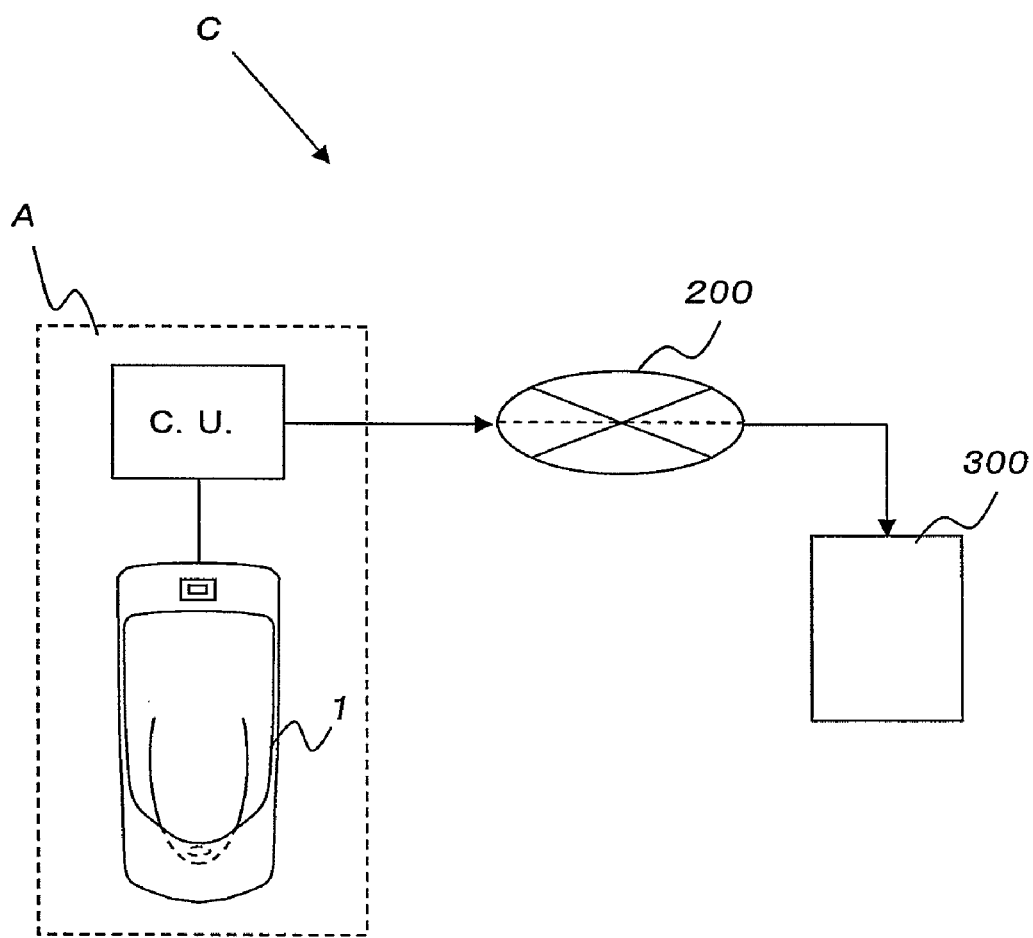
FIG. 16 is a block diagram showing the general configuration of a third embodiment.

FIG. 10
図 3の S5 から FROM S5 IN FIG. 3
S81 PUSH SET BUTTON
S82 SETUP DATA DISPLAY
S83 SHOULD SETUP DATA BE ALTERED?
S84 SETTING DATA ENTRY
S85 SETTING DATA STORAGE
S86 TO R1 IN FIG. 3
図 3の R1へ TO R1 IN FIG. 3
FIG. 11
12 BLOWER
13 HIGH VOLTAGE TRANSFORMER
7 HUMAN BODY DETECTION
8 SURROUNDING ENVIRONMENT DETECTION/TRANSMISSION
4 MIXER
V3 CHECK VALVE
2 WATER ACTIVATOR
V1 ELECTROMAGNETIC VALVE
FIG. 12
12 BLOWER
13 HIGH VOLTAGE TRANSFORMER
7 HUMAN BODY DETECTION
8 SURROUNDING ENVIRONMENT DETECTION/TRANSMISSION
4 MIXER
V3 CHECK VALVE
2 WATER ACTIVATOR
V1 ELECTROMAGNETIC VALVE
FIG. 13
12 BLOWER
14B CHEMICAL
13B HEATER
7 HUMAN BODY DETECTION
8 SURROUNDING ENVIRONMENT DETECTION/TRANSMISSION
4 MIXER
V3 CHECK VALVE
2 WATER ACTIVATOR
V1 ELECTROMAGNETIC VALVE
FIG. 14
12 BLOWER
14B CHEMICAL
13B HEATER
7 HUMAN BODY DETECTION
8 SURROUNDING ENVIRONMENT DETECTION/TRANSMISSION
4 MIXER
V3 CHECK VALVE
2 WATER ACTIVATOR
V1 ELECTROMAGNETIC VALVE
FIG. 15
12 BLOWER
14B CHEMICAL
13B HEATER
7 HUMAN BODY DETECTION
8 SURROUNDING ENVIRONMENT DETECTION/TRANSMISSION
4 MIXER
V3 CHECK VALVE
2 WATER ACTIVATOR
V1 ELECTROMAGNETIC VALVE

What is claimed is:

1. A urinal comprising:
a human body sensor;
a control unit;
a mechanism to generate a gas with high detergency;
a gas flow line in which generated gas with high detergency flows; and
a cleaning water supply line in which cleaning water flows, wherein:
the gas flow line and the cleaning water supply line converge to mix the gas with high detergency with the cleaning water;
a cleaning fluid line formed by confluence of the gas flow line and the cleaning water supply line is communicated with a cleaning fluid ejection hole on a urinal upper edge; and
the control unit is configured to perform control operation so that:
when the human body sensor detects the urinal being in use, gas with high detergency is ejected from the cleaning fluid ejection hole through the gas flow line and the cleaning fluid line for a first specified time; and
when the human body sensor detects completion of use of the urinal, combined and mixed cleaning water and gas with high detergency are passed through the cleaning fluid line and ejected from the cleaning fluid ejection hole for a second specified time.

2. The urinal according to claim 1, wherein the control means is configured to perform control operation so that after the combined and mixed cleaning water and gas with high detergency are passed through the cleaning fluid line and ejected from the cleaning fluid ejection hole for the second specified time, the gas with high detergency is passed through the gas flow line and the cleaning fluid line and ejected from the cleaning fluid ejection hole for a third specified time.

* * * * *